(12) United States Patent
Bae et al.

(10) Patent No.: US 8,490,620 B1
(45) Date of Patent: Jul. 23, 2013

(54) IN-GROUND SOLAR TROUGH (75) Inventors: Koeunyi Bae, Sicklerville, NJ (US);
Stephen A. Monforto, Laurel Springs, NJ (US); Alan E. Taber, Cinnaminson, NJ (US); David S. Munsky, Morganville, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 712 days.

(21) Appl. No.: 12/256,749

(22) Filed: Oct. 23, 2008

(51) Int. Cl.
*F24J 3/02* (2006.01)
*F24J 2/38* (2006.01)

(52) U.S. Cl.
USPC ........... 126/605; 126/600; 126/438; 126/425; 126/270; 126/271; 136/244; 353/3

(58) Field of Classification Search
USPC .... 126/600, 605, 696, 415, 634; 136/4; 353/3
See application file for complete search history.

(56) References Cited

U.S. PATENT DOCUMENTS

| | | | | |
|---|---|---|---|---|
| 3,655,149 A * | 4/1972 | Williams | | 244/225 |
| 4,111,184 A * | 9/1978 | Fletcher et al. | | 126/577 |
| 4,297,003 A | 10/1981 | Hutchison | | |
| 4,516,018 A | 5/1985 | Bodenheimer et al. | | |
| 4,590,920 A * | 5/1986 | Sainsbury | | 126/576 |
| 4,820,033 A * | 4/1989 | Sick | | 359/852 |
| 4,967,730 A | 11/1990 | Billheimer | | |
| 5,203,318 A | 4/1993 | Chauvet | | |
| 5,325,844 A * | 7/1994 | Rogers et al. | | 126/605 |
| 5,374,939 A | 12/1994 | Pullen V | | |
| 5,602,384 A | 2/1997 | Nunogaki et al. | | |
| 5,899,199 A | 5/1999 | Mills | | |
| 5,964,216 A * | 10/1999 | Hoffschmidt et al. | | 126/696 |
| 5,997,144 A | 12/1999 | Mills et al. | | |
| 6,084,228 A | 7/2000 | Hill et al. | | |
| 6,127,620 A | 10/2000 | Tange et al. | | |
| 6,131,565 A | 10/2000 | Mills | | |
| 6,142,638 A | 11/2000 | Zemel et al. | | |
| 6,297,740 B1 | 10/2001 | Hill et al. | | |
| 6,349,718 B1 | 2/2002 | Ven et al. | | |
| 6,363,928 B1 * | 4/2002 | Anderson, Jr. | | 126/577 |
| 6,396,040 B1 | 5/2002 | Hill | | |

(Continued)

FOREIGN PATENT DOCUMENTS

JP 11281167 * 10/1999
WO WO2007087680 * 8/2007

OTHER PUBLICATIONS

Kearney, David W., "Parabolic Trough Collector Overview", Parabolic Trough Workshop 2007 at the National Renewable Energy Laboratory, Golden CO, Mar. 2007.

(Continued)

*Primary Examiner* — Steven B McAllister
*Assistant Examiner* — Nikhil Mashruwala
(74) *Attorney, Agent, or Firm* — Howard IP Law Group, PC (57) ABSTRACT

A solar trough includes a light receiver for transporting a fluid to be heated by the solar trough, at least one rail partially or fully disposed in a trench, a parabolic light collector slidably mounted on the at least one rail, and a drive unit for rotating the parabolic light collector within the trench. Further, a solar trough system made up of a plurality of the solar troughs.

15 Claims, 7 Drawing Sheets

U.S. PATENT DOCUMENTS

| | | | |
|---|---|---|---|
| 6,530,369 B1 | 3/2003 | Yogev et al. | |
| 6,672,018 B2 * | 1/2004 | Shingleton | 52/173.3 |
| 6,672,729 B1 | 1/2004 | Schaefer | |
| 6,708,687 B2 | 3/2004 | Blackmon, Jr. et al. | |
| 6,875,974 B2 | 4/2005 | Muesch et al. | |
| 6,911,110 B2 | 6/2005 | Blackmon, Jr. et al. | |
| 6,959,993 B2 | 11/2005 | Gross et al. | |
| 7,192,146 B2 * | 3/2007 | Gross et al. | 359/853 |
| 7,235,765 B2 | 6/2007 | Clugston, Jr. | |
| 7,252,084 B2 | 8/2007 | Pawlenko et al. | |
| 7,260,934 B1 | 8/2007 | Roberts | |
| 7,950,387 B2 * | 5/2011 | Kimura et al. | 126/696 |
| 2006/0124123 A1 * | 6/2006 | Whelan | 126/696 |
| 2007/0186921 A1 * | 8/2007 | Swanepoel | 126/600 |
| 2007/0205240 A1 * | 9/2007 | Castro et al. | 224/328 |
| 2007/0240704 A1 * | 10/2007 | Prueitt | 126/600 |

OTHER PUBLICATIONS

"Solar Power Plant", http://www.eng.fsu.edu/-shih/succeed-2000/roadmap/solar%20power%20plant.htm, printed Apr. 29, 2008, pp. 1-4.

"Industrial Solar Technology Corp.", http://www.industrialsolartech.com/trghtech.htm, printed Apr. 29, 2008, pp. 1-5.

"Parabolic trough", http://en.wikipedia.org/wiki/Parabolic_trough, printed Apr. 29, 2008, pp. 1-3.

"Parabolic-Trough Solar Water Heating", Federal Technology Alert, Prepared by the new Technology Demonstration Program, Produced for the U.S. Department of Energy (DOE) by the National Renewable Energy Laboratory, DOE/GO-102000-0973 (A revision of DOE/GO-10098-485), Revised Jan. 2000, Originally printed Apr. 1998.

"Solar Trough Systems", Produced for the U.S. Department of Energy by Sun Lab, DOE/GO-10097-395, Apr. 1998.

* cited by examiner

IN-GROUND SOLAR TROUGH

FIELD OF INVENTION

The present invention relates to solar energy devices and systems, and in particular, relates to a solar trough system dug or otherwise formed in the earth or ground.

BACKGROUND OF THE INVENTION

Existing parabolic solar trough systems include a plurality of parabolic solar troughs that focus the sun's heat into a heat-transfer fluid that flows through receivers of the solar troughs. The heated fluid may then be used to generate steam for conventional electricity producing steam turbines, heat water in hot water storage tanks, and the like. Such systems operate automatically at high efficiency and can be competitive with fossil fuel.

The parabolic solar troughs of current systems have parabolic light collectors, which track the sun along one axis. The parabolic light collectors include mirrors that are supported high above the earth's surface by complex aluminum space frames or torsion boxes, which are time-consuming and expensive to manufacture. The above-the-earth parabolic light collectors are also subject to damaging wind and weather loads.

The parabolic light collector must always be focusing the sun's heat on the receiver as the light collectors track the sun, therefore, the alignment between the light collector and the receiver must be precisely maintained. Because the receivers of current parabolic troughs are constructed to rotate with their corresponding above-the-earth parabolic light collectors, the system parasitic loads are higher due to increased pressure losses in the flexible couplings between troughs.

Accordingly, a parabolic solar trough system is needed that is less expensive and faster to manufacture and which also allows fixed couplings for less pressure loss than current parabolic solar trough systems.

SUMMARY OF INVENTION

Disclosed herein is a solar trough comprising a light receiver for transporting a fluid to be heated by the solar trough; at least one rail partially or fully disposed in a trench, a parabolic light collector for focusing sun-light on the light receiver slidably mounted on the at least one rail, and a drive unit for rotating the parabolic light collector within the trench.

Further disclosed herein is a solar trough system comprising a plurality of solar troughs.

Also disclosed herein is a method for making a solar trough. The method comprises forming a trench in a ground area, laying at least one rail in the trench, slidably mounting a parabolic light collector on the at least one rail, coupling a drive unit to the parabolic light collector for rotating the parabolic light collector within the trench, and locating a light receiver at a focal point of the parabolic light collector, the light receiver for transporting a fluid to be heated by the solar trough.

DETAILED DESCRIPTION OF THE INVENTION

Figure 1:
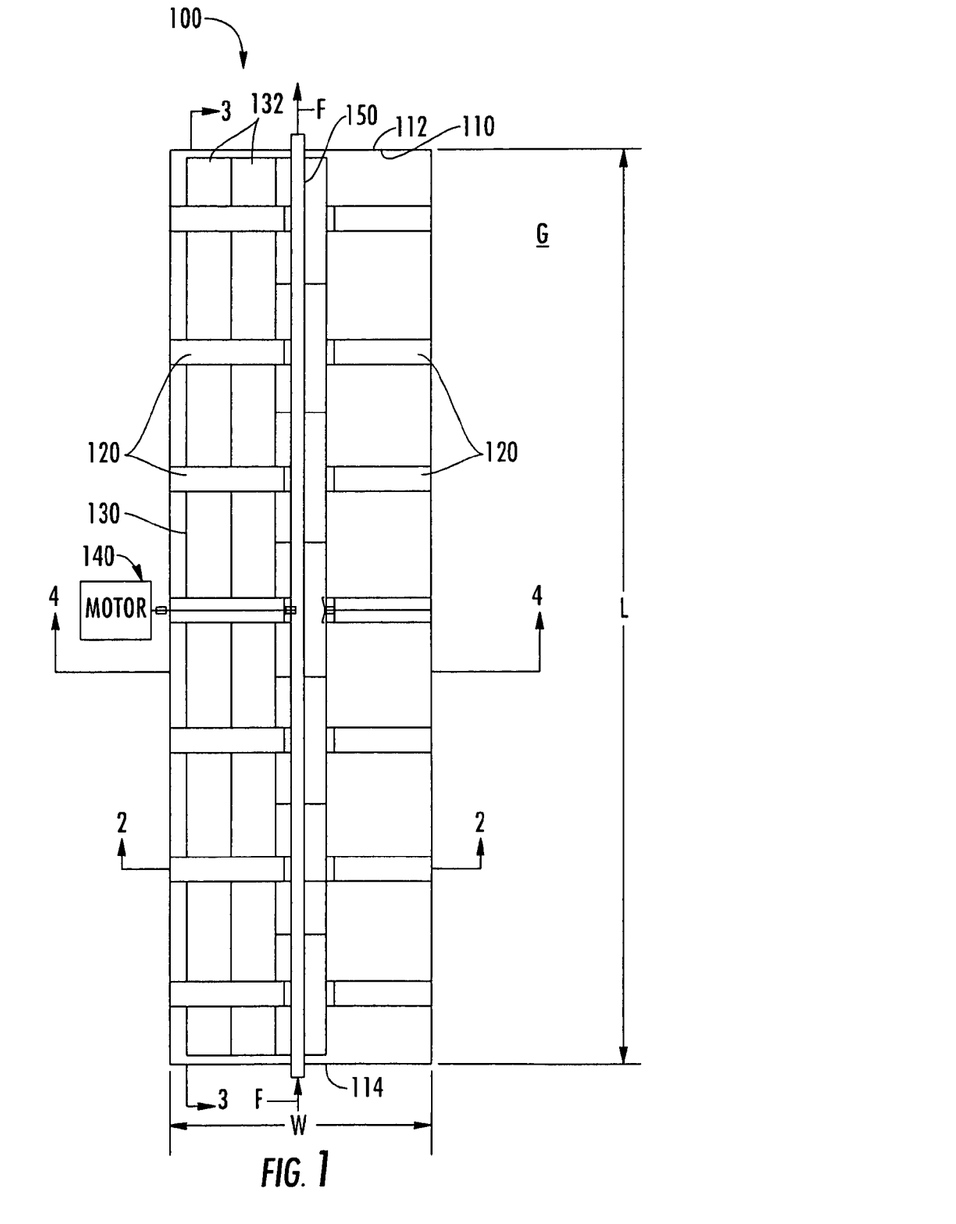
FIG. 1 is a top view of an embodiment of an in-ground parabolic solar trough.
Figure 2:
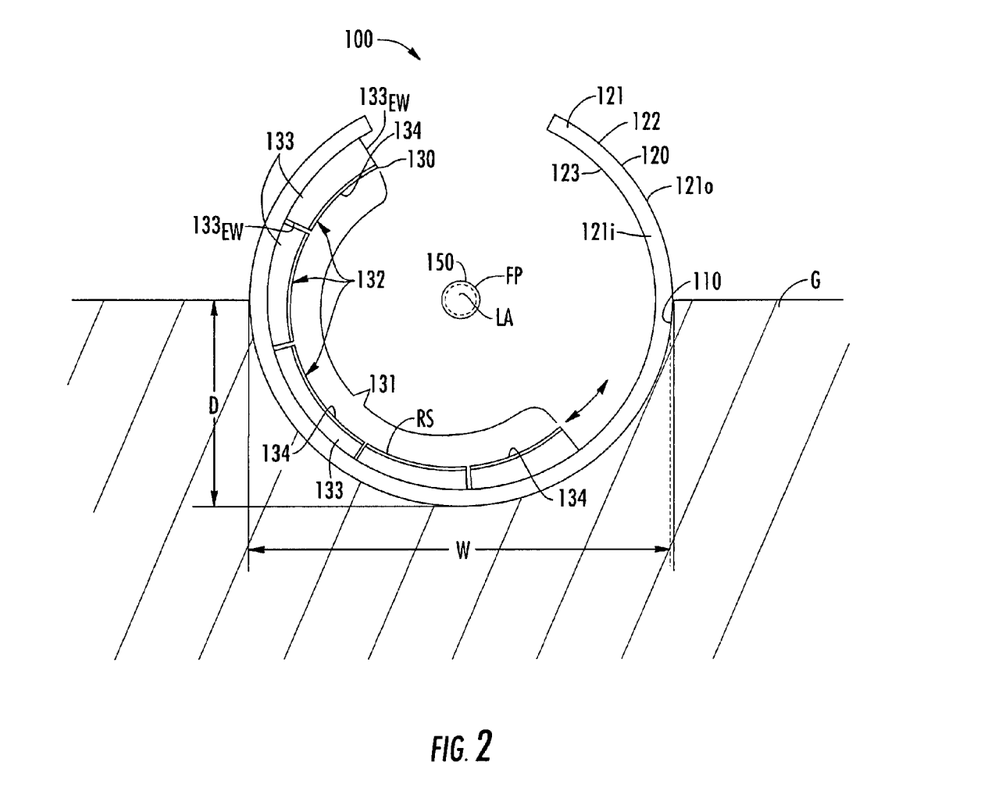
FIG. 2 is a sectional view through line 2-2 of FIG. 1.

FIGS. 1 and 2 collectively illustrate an embodiment of an in-ground parabolic solar trough 100, according to the present disclosure. The in-ground parabolic solar trough 100 generally includes an elongated trench dug 110 or otherwise formed in the earth or ground G, a plurality of rails 120 lining the surface of or otherwise disposed in the trench 110, a parabolic light collector 130 slidably mounted on the rails 120, a drive unit 140 for rotating the parabolic light collector 130 within the trench 110, and a light receiver 150 disposed at a focal point FP of the parabolic light collector 130.

As shown in FIG. 2, the trench 110 formed in the earth or ground should have a contour which is suitable for securely supporting the rails 120 and which may correspond with the outer contour of the rails 120. In one embodiment, the contour of the trench 110 is half- or semi-cylindrical in shape. In other embodiments, however, the contour of the trench 110 may be other suitable shapes, depending upon the outer contour or construction of the rails 120. The trench 110 may be formed to a length L of about 100 meters, a width W of about 3.5 meters and a depth D of about 3.5 meters. The trench 110 may also be formed to other length, width, and/or depth dimensions, if desired.

Figure 3:
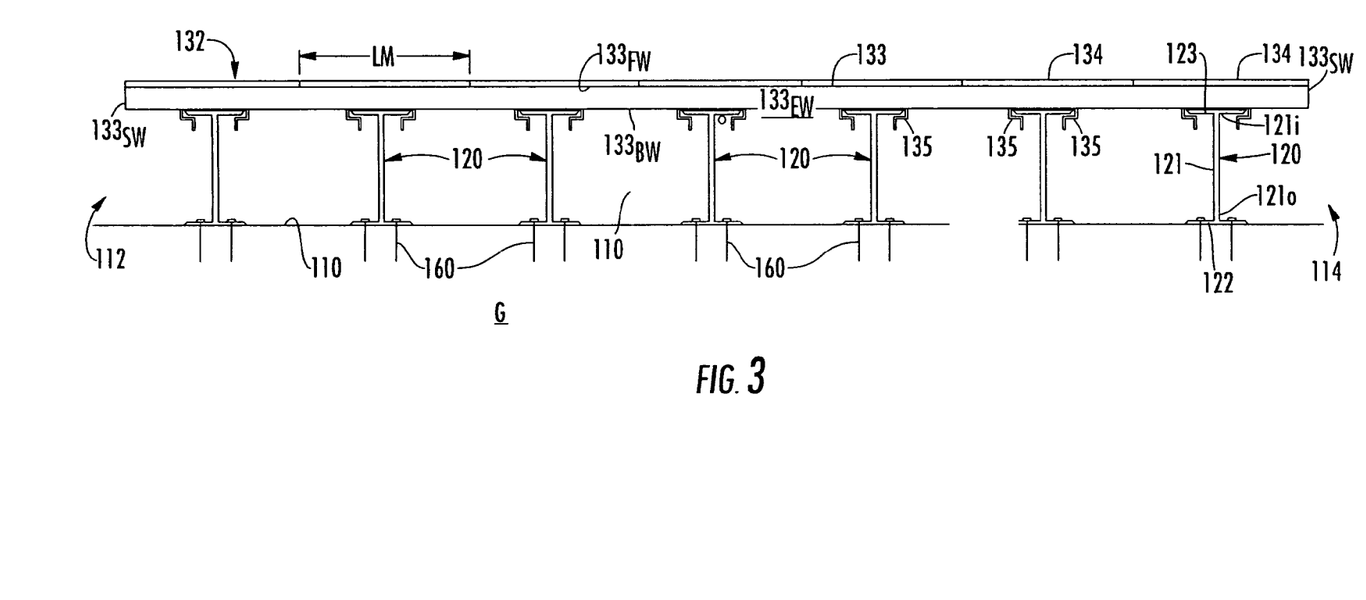
FIG. 3 is a sectional view through line 3-3 of FIG. 1.

Each rail 120 disposed within the trench 110 may have a generally curved shape which is adapted for slidaby mounting the parabolic light collector 130. For example, as collectively shown in FIGS. 2 and 3, each rail 120 has a semi-circular curved in shape, with an I-shape transverse cross-section formed by a vertical web 121, a horizontal outer flange 122 disposed at an outer end 121o of the vertical web 121, and a horizontal inner flange 123 disposed at an inner end 121i of the vertical web 121. The rails, in other embodiments, may be constructed in other suitable shapes that allow for easy construction and proper movement and focus of the parabolic light collector 130. Each rail 120 is transversely positioned in the trench 110 and securely anchored therein by elongated fasteners 160 (FIG. 3). The rails 120 are evenly spaced from one another along the length of the trench 110 from a marginal first end 112 to a marginal second end 114 thereof.

The parabolic light collector 130 is slidably mounted on the rails 120, as collectively shown in FIGS. 2 and 3. In one embodiment, the parabolic light collector 130 includes an array 131 of elongated light concentrators 132. As shown in FIG. 3, each light concentrator 132 of the array 131 extends between the first and second ends 112, 114 of the trench 110, and is slidably coupled to the rails 120. Each light concentrator 132, in one embodiment, includes an elongated riser 133, a plurality of mirror segments 134 fixedly mounted to an elongated front wall $133_{FW}$ of the riser 133 and a plurality of attaching clips 135 fixedly mounted to an elongated back wall $133_{BW}$ of the riser 133 for slidably coupling the riser 133 to the inner flanges 123 of the rails 120. The mirror segments 134 form a parabolic-shaped reflector surface RS having a focal point F which is coaxial with a longitudinal axis LA of the receiver 150. The number of mirror segments 134 used in the light concentrator 132, is a function of the sidewall length $L_M$ of each mirror segment 134, the manufacturing cost of the solar trough 100, and the performance desired from the solar trough 100. The mirror segments 134 may have any suitable sidewall length $L_M$. For example, in one embodiment, the sidewall length $L_M$ of each mirror segment 134 may be about 0.5 meters.

Figure 6:
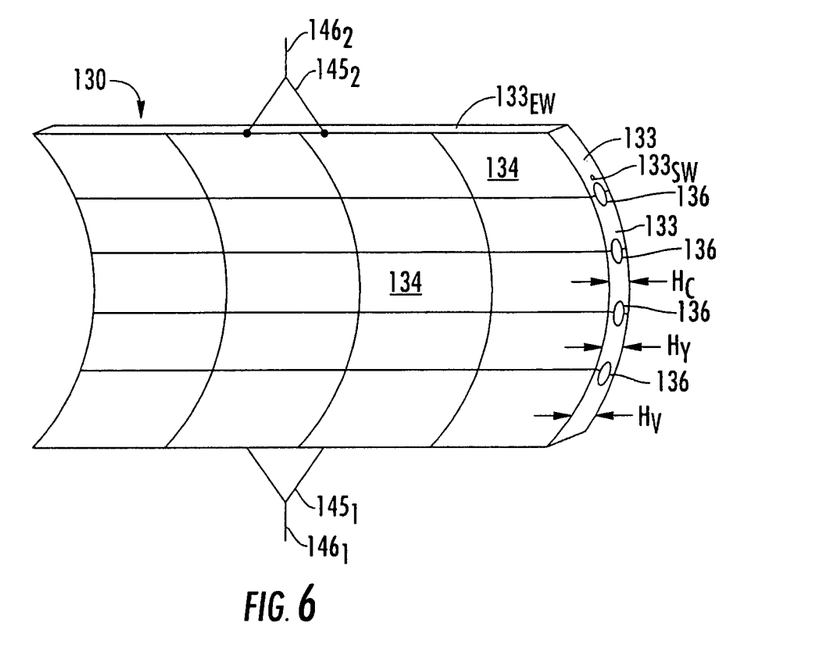
FIG. 6 is a perspective view of an embodiment of the parabolic light collector.

The risers 133 of the light concentrators 132 are connected to one another, thus forming the parabolic light collector 130, as shown in FIG. 6. Each riser 133 may have a hollow, box-like structure including the earlier mentioned elongated front and back walls $133_{FW}$, $133_{BW}$, a pair of elongated end walls $133_{EW}$ and a pair of side walls $133_{SW}$. Links 136 may be used for connecting the risers 133 to one another. The links 136 may connect the end walls $133_{EW}$ and/or the side walls $133_{SW}$ of the risers 133 to one another. The ends of the links 136 may be pivotally or fixedly fastened to end walls $133_{EW}$ and/or the side walls $133_{SW}$ of the risers 133 by rivets or other suitable fasteners. In other embodiments, the risers 133 may be connected to one another by mounting all the risers 133 on a thin sheet of metal or plastic (not shown). The height $H_C$ of the riser 133 of the central-most light concentrator 132, is constant from end wall to end wall $133_{EW}$, however, the height HV of the risers 133 of the other light concentrators 132, moving away from the central-most light concentrator 132, increases from end wall to end wall $133_{EW}$. As shown in FIG. 2, this arrangement angles the mirror segments 134 so that they form the parabolic-shaped reflector surface RS having the focal point F.

Figure 5:
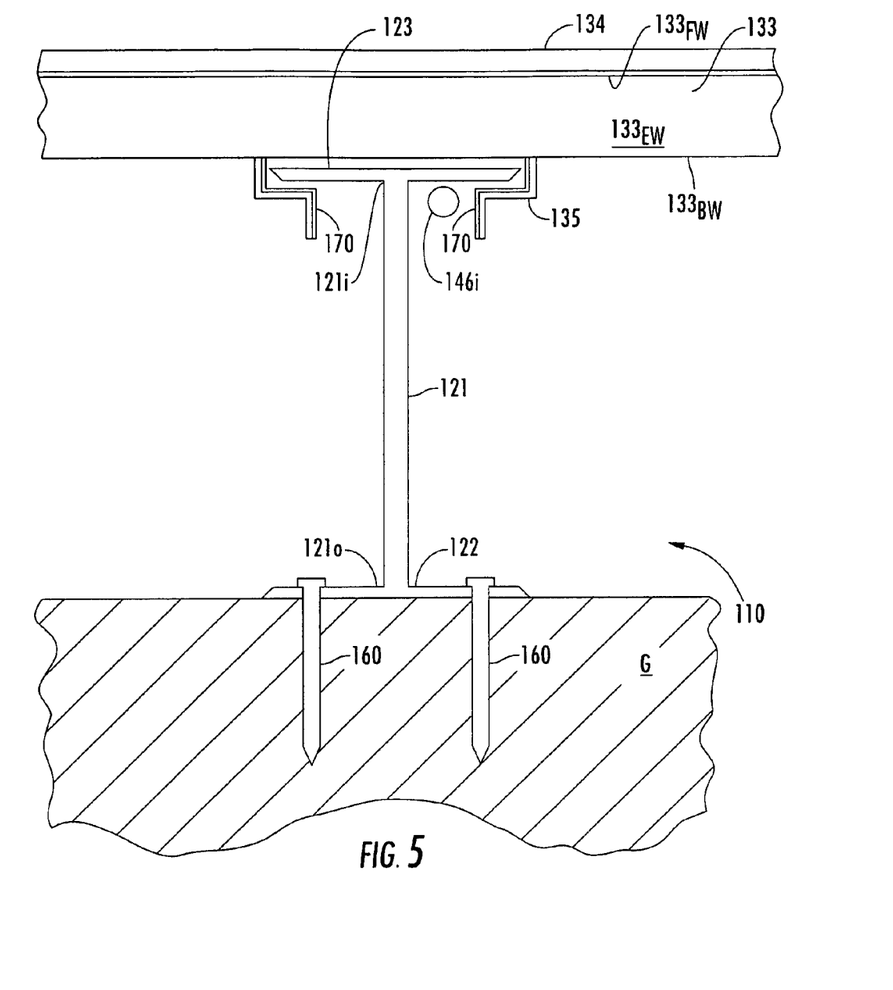
FIG. 5 is an enlarged sectional view through a central most one of the rails.

Referring to FIG. 5 bearing surface(s) of each attaching clip 135 slidingly engage corresponding bearing surface(s) of the inner flange 123 of the corresponding rail 120. The bearing surfaces of the clips and/or the inner flange may be lined, coated, and or impregnated with a layer 170 of low friction material that reduces the friction between the bearing surfaces(s) of the attaching clips 135 and the rails 120, thereby allowing the light concentrators 132 to slide easily on the rails 120 when the parabolic light collector 130 is rotated.

Referring again to FIG. 1, the receiver 150 extends the length of the trench 110 along the focal point F of the parabolic light collector 130 and carries a heat transfer fluid. The receiver 150 may be affixed to the surface of the ground or earth at each end of the trench 110 with one or more clamps or bearings (not shown), which allow for axial movement of the receiver 150 due to thermal expansion. The fluid F may be an organic or synthetic oil, water, a solution of water and anti-freeze, or molten ionic or nitrate salt. The receiver 150 may be conventionally constructed as a glass encased absorbent-coated tube. In other embodiments, the receiver 150 may comprise a simple tube without any type of cover or coating. The fluid is circulated through the receiver 150 by a pump (not shown). After being heated by the parabolic light collector 130, the fluid is delivered to a heat exchanger (not shown) where it may be used to heat a hot water storage tank (not shown), create steam for process heating, or heat water in a steam generator (not shown) to turn a steam turbine (not shown) and generate electric power.

Figure 4:
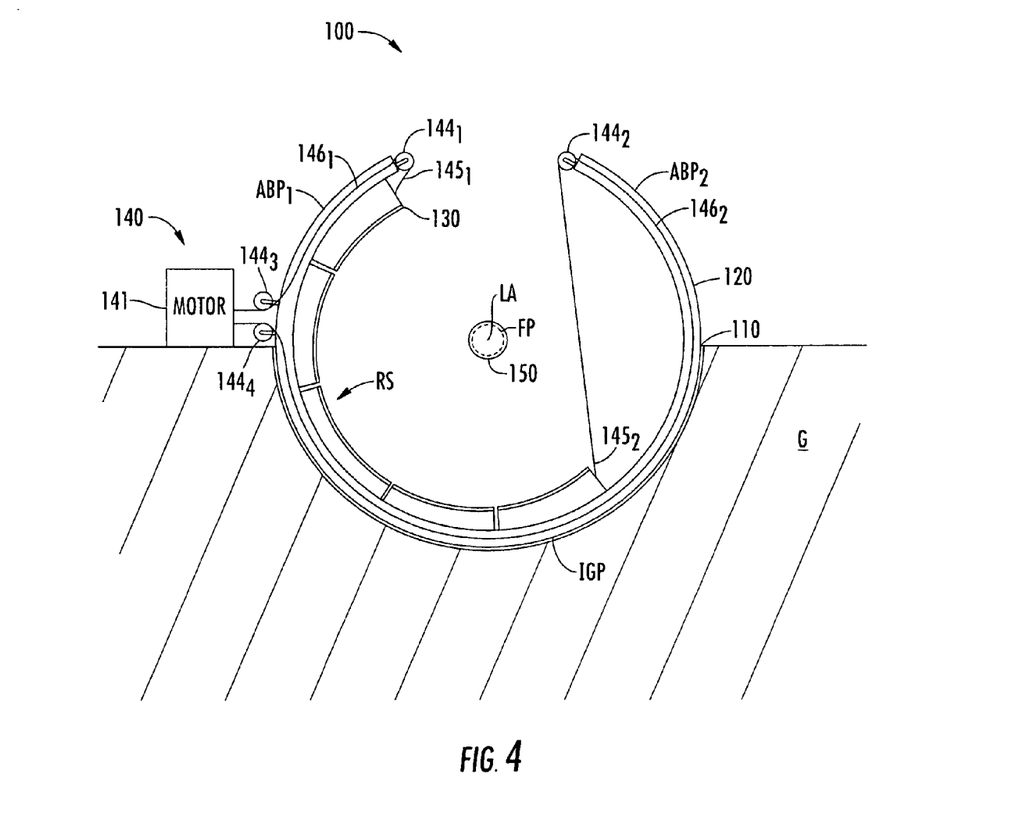
FIG. 4 is a sectional view through line 4-4 of FIG. 1.
Figure 7:
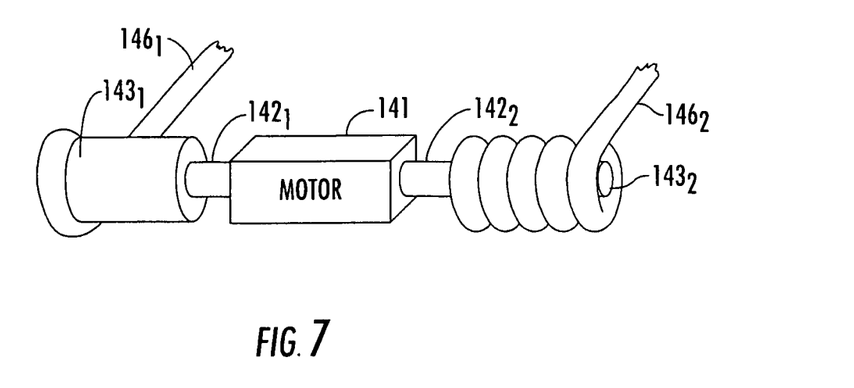
FIG. 7 is a perspective view of an embodiment of the motor of a drive unit.

As collectively shown in FIGS. 1 and 4, the drive unit 140 in one embodiment, is disposed on the ground adjacent to a generally central area of the solar trough 100 and drives the parabolic light collector 130 so that it may track the sun continuously during the day. In one embodiment, as shown in FIG. 7, the drive unit 140 may include a motor 141 with first and second opposing drive-shafts $142_1$, $142_2$.

Referring collectively to FIGS. 4 and 6, the drive unit 140 further includes a cable winding spool $143_1$, $143_2$ attached to each of the drive-shafts $142_1$, $142_2$. A first pulley $144_1$ is rotatively disposed on a first end of one of the rails 120 at the generally central area of the solar trough 100, a second pulley $144_2$ is rotatively disposed on a second end of this rail 120, a third upper pulley $144_3$ is rotatively disposed between the rail 120 and the motor 141, and a fourth lower pulley $144_4$ is rotatively disposed between the rail 120 and the motor 141. A first yoke $145_1$ is connected to a first end of the parabolic light collector 130 at a generally central location thereof and a second yoke $145_2$ is connected to a second end of the parabolic light collector 130 at a generally central location thereof. A first cable $146_1$ has a first end attached to the first yoke $145_1$ and a second end attached to the first spool $143_1$ and a second cable $146_2$ has a first end attached to the second yoke $145_2$ and a second end attached to the second spool $143_2$. Starting at the first yoke $145_1$ and moving toward the first spool $143_1$, the first cable $146_1$ extends to the first pulley $144_1$, rides over a top of the first pulley $144_1$, extends about a first above-ground portion $ABP_1$ of the rail 120 on the motor side thereof, rides under the bottom of the third upper pulley $144_3$, and then extends to the first spool $143_1$. Starting at the second yoke $145_2$ and moving toward the second spool $143_2$, the second cable $146_2$ extends to the second pulley $144_2$, rides over a top of the second pulley $144_2$, extends about a second above-ground $ABP_2$ portion of the rail 120 on a remote side of the rail 120 opposite the motor 141 and about an in-ground portion IGP of the rail 120, rides over a top of the fourth lower pulley $144_4$, and then extends to the second spool $143_2$. The first and second cables $146_1$, $146_2$ maintain tension on the solar trough 100 as the motor 141 rotates the parabolic light collector 130. As shown in FIG. 5, the first and second cables $146_1$, $146_2$ may be guided about the rails 120 by the attaching clips 135.

Figure 8:
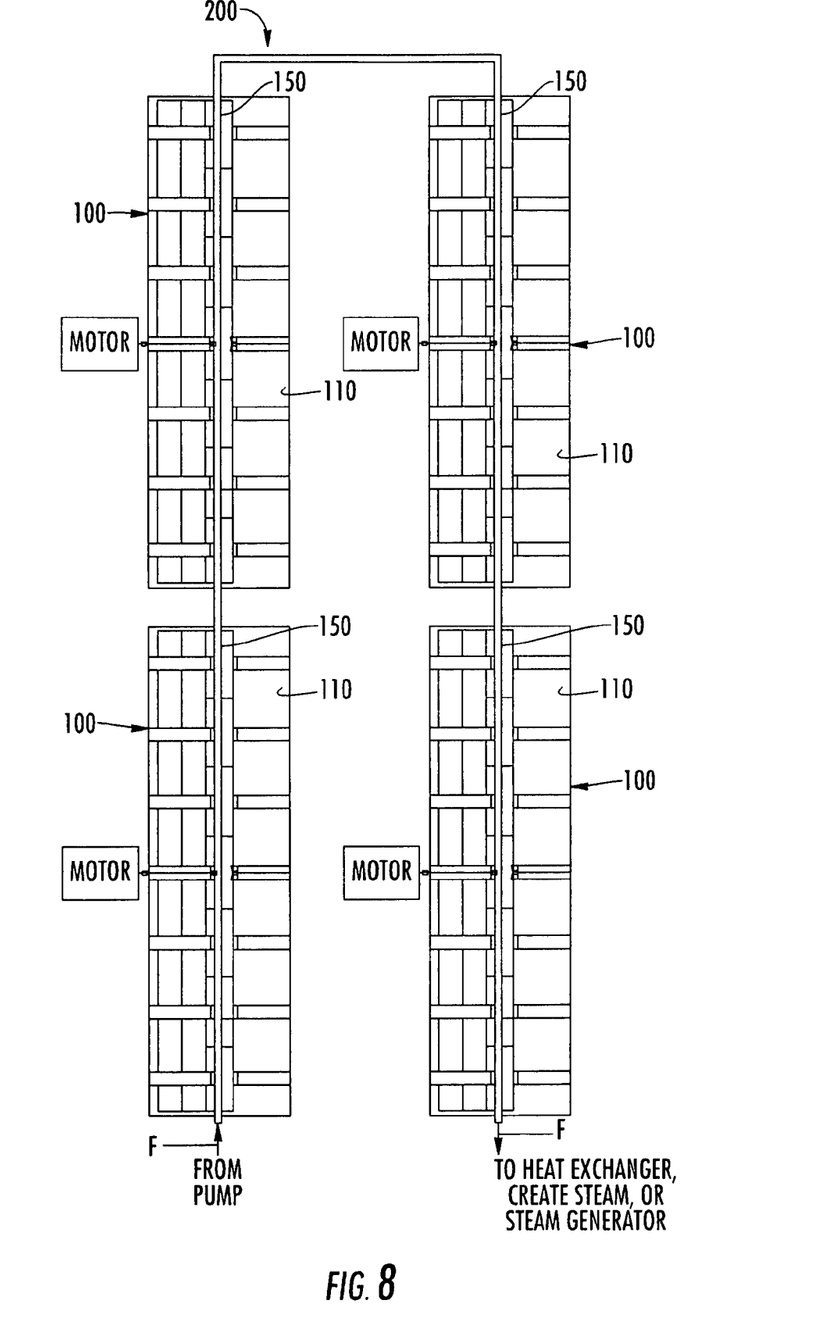
FIG. 8 is a perspective view of an embodiment of a solar trough system.

Referring to FIG. 8, an array of the solar troughs 100 of the present disclosure may be arranged in parallel rows to form a solar trough system 200. The receivers 150 of the solar troughs 100 are serially connected to one another to form a single circuit. The trenches 110 of the solar troughs in each row may be separate and discrete from one another. Alternatively, the solar troughs 100 in each row may use one very elongated continuous trench 110.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system for collecting solar energy comprising:
   a light receiver;
   a rail comprising a curved bearing surface on a to surface of the rail;
   a reflector configured to redirect light toward the light receiver;
   at least one riser coupled to the reflector on a first side of the riser, the at least one riser comprising a first end and a second end, and a curved bearing surface having a length extending from the first end to the second end of the riser on a second side thereof for coupling with the curved bearing surface of the rail,
   wherein sliding the bearing surface of the at least one riser along the curved bearing surface alters the angular orientation of the reflector,
   wherein each riser is slidably coupled to the curved bearing surface via a clip, the clip attached to the second side of each riser and slidably coupled with a downward facing portion of the rail, and
   wherein the curved bearing surface of the riser and the curved bearing surface of the rail comprise an equal radius of curvature such that the curved bearing surface of the riser is in contact with the curved bearing surface of the rail over the entire length of the curved bearing surface of the riser.

2. The solar trough system of claim 1, wherein the bearing surface of the rail extends from a point proximate a first end of the rail to a point proximate a second end of the rail.

3. The solar trough system of claim 1, wherein the rail has an I-shape cross section including a first flange comprising the bearing surface, and a second flange configured for securing the rail within a trench.

4. The system of claim 3, wherein the trench is elongated and the rail is disposed transverse to a longitudinal axis of the trench.

5. The system of claim 1, wherein the reflector is formed by an array of light concentrators.

6. The system of claim 1, further comprising a drive unit, wherein the drive unit includes a motor and a cable arrangement coupled to the reflector, the motor for winding and unwinding the cable arrangement to slide the reflector along a length of the bearing surface of the rail.

7. A solar trough comprising:
a light receiver for transporting a fluid to be heated by the solar trough;
at least one rail partially or fully disposed in a trench having a curved bearing surface along a length thereof; and
a parabolic light collector slidably mounted on the bearing surface of the at least one rail, the parabolic light collector for focusing sun-light on the light receiver;
wherein the parabolic light collector includes a plurality of risers and a plurality of mirror segments, each of the risers including at least one of said plurality of mirror segments on a first side thereof and each of the risers having a bottom curved bearing surface for slidably coupling with the curved bearing surface on a second side thereof of the at least one rail,
wherein each riser of the plurality of risers is connected in series so as to form a curved shape about the light receiver,
wherein each riser is slidably coupled to the curved bearing surface via a clip, the clip attached to the second side of each riser and slidably coupled with a downward facing portion of the rail, and
wherein the curved bearing surface of the riser and the curved bearing surface of the rail comprise an equal radius of curvature such that the curved bearing surface of the riser is in contact with the curved bearing surface of the rail over the entire length of the curved bearing surface of the riser.

8. A method for making a solar trough, the method comprising:
forming a trench in a ground area;
laying at least one rail in the trench;
mounting a parabolic light collector on a first side of a riser, wherein the parabolic light collector includes a plurality of risers and a plurality of mirror segments, each of the risers including at least one of said plurality of mirror segments and having a bottom curved bearing surface on a second side thereof;
slidably mounting the bottom curved bearing surface of each of the risers on a curved bearing surface formed on a length of the at least one rail;
coupling a drive unit to the parabolic light collector, the drive unit for sliding the curved bearing surface of the riser along the curved bearing surface of the at least one rail within the trench; and locating a light receiver at a focal point of the parabolic light collector, the light receiver for transporting a fluid to be heated by the solar trough,
wherein each riser of the plurality of risers is connected in series so as to form a curved shape about the light receiver,
wherein each riser is slidably coupled to the curved bearing surface via a clip, the clip attached to the second side of each riser and slidably coupled with a downward facing portion of the rail, and
wherein the curved bearing surface of the riser and the curved bearing surface of the rail comprise an equal radius of curvature such that the curved bearing surface of the riser is in contact with the curved bearing surface of the rail over the entire length of the curved bearing surface of the riser.

9. A system for collecting solar energy comprising:
a light receiver;
a rail comprising a curved bearing surface on an upper surface of the rail;
a reflector configured to redirect light toward the light receiver;
at least one riser coupled to the reflector on a first side thereof, and having a curved bearing surface on a second side thereof, the at least one riser slidably coupled to the curved bearing surface of the rail,
wherein sliding the at least one riser along the curved bearing surface alters the angular orientation of the reflector,
wherein the at least one riser is slidably coupled to the curved bearing surface, of the rail via a clip, the clip attached to the second side of the at least one riser and slidably coupled with a downward facing portion of the rail, and
wherein the curved bearing surface of the riser and the curved bearing surface of the rail comprise an equal radius of curvature such that the curved bearing surface of the riser is in contact with the curved bearing surface of the rail over the entire length of the curved bearing surface of the riser.

10. The system of claim 9, wherein the rail comprises a flange, and the clip is slidably attached to the flange.

11. The system of claim 10, wherein a top surface of the flange comprises the curved bearing surface, and the clip is configured to engage a bottom surface of the flange, opposite the top surface.

12. The system of claim 11, where in clip is configured to slidably capture the flange between itself and the second side of the at least one riser.

13. The system of claim 9, further comprising:
wherein the drive system comprises:
a first tensioning member connected on a first end thereof to a first end of at least one of the at least one riser and the reflector, and connected on a second end thereof to a rotatable drive unit;
a second tensioning member connected on a first end thereof to a second end opposite the first end of the at least one of the at least one riser and the reflector, and connected on a second end therefore to the rotatable drive unit,
wherein rotation of the drive unit in a first direction tensions one of the first and second tensioning members, sliding the at least one riser along the curved bearing surface for altering the angular orientation of the reflector, and rotation of the drive unit in the second direction tensions the other of the first and second tensioning members.

14. The system of claim 13, wherein the drive system further comprises:
- a first pulley arranged proximate a first end of the rail for guiding the first tensioning member, and
- a second pulley arranged proximate a second end of the rail for guiding the second tensioning member.

15. The system of claim 13, wherein the drive unit comprises at least one drive shaft, wherein the rotation of the drive shaft is configured to wind a length of one of the first or second tensioning members around the at least one drive shaft, while unwinding a length of the remaining one of the first or second tensioning members.

\* \* \* \* \*

UNITED STATES PATENT AND TRADEMARK OFFICE
CERTIFICATE OF CORRECTION

PATENT NO. : 8,490,620 B1
APPLICATION NO. : 12/256749
DATED : July 23, 2013
INVENTOR(S) : Koeunyi Bae et al.

It is certified that error appears in the above-identified patent and that said Letters Patent is hereby corrected as shown below:

In the Claims:

Column 4, Line 49, Claim 1, the word "to" should read "top".

Signed and Sealed this
Third Day of September, 2013

Teresa Stanek Rea
*Acting Director of the United States Patent and Trademark Office*